Aug. 1, 1950     C. F. LAUENSTEIN     2,517,497
METHOD OF INCREASING THE FATIGUE
STRENGTH OF CHAIN LINKS
Filed March 31, 1947     3 Sheets—Sheet 1
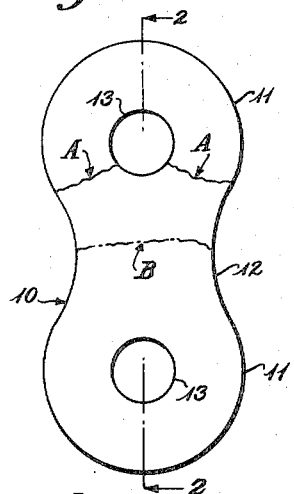
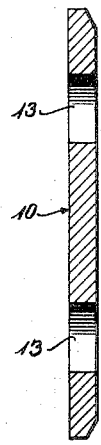
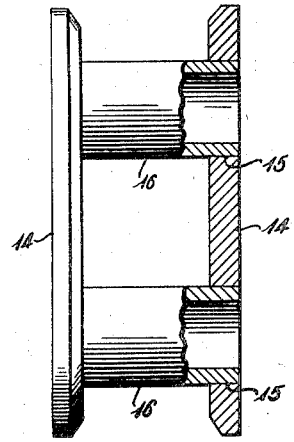
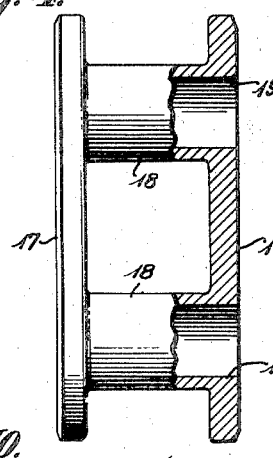
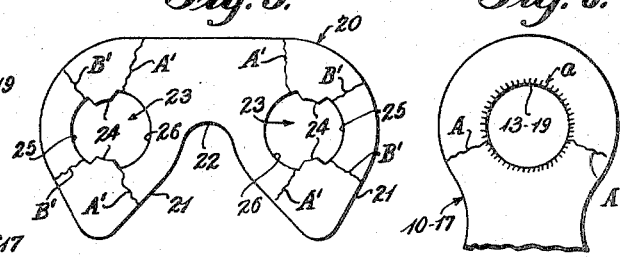
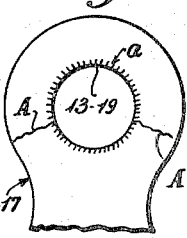
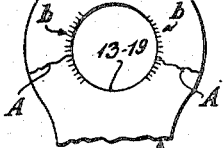
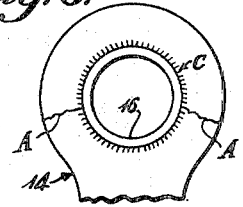
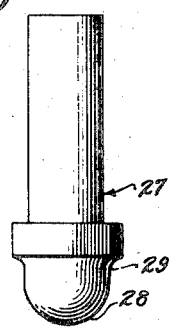
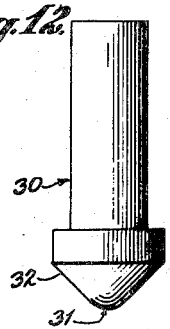
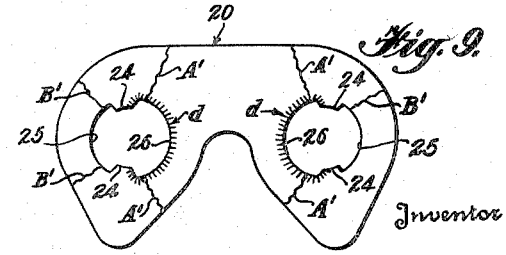
Inventor
Carl F. Lauenstein
By L. Penell Myers
Attorney Aug. 1, 1950
C. F. LAUENSTEIN
2,517,497
METHOD OF INCREASING THE FATIGUE
STRENGTH OF CHAIN LINKS
Filed March 31, 1947
3 Sheets-Sheet 2
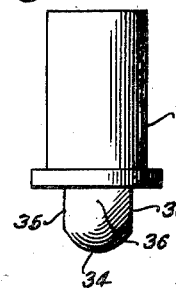
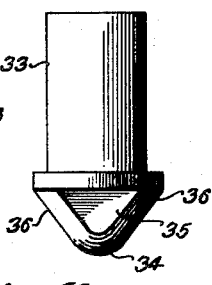
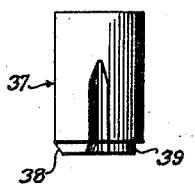
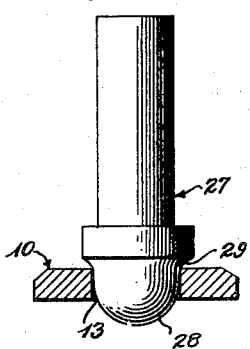
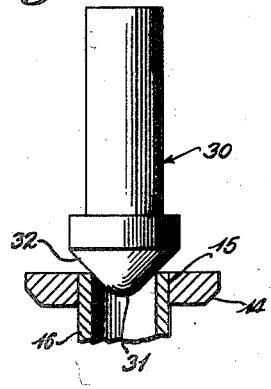
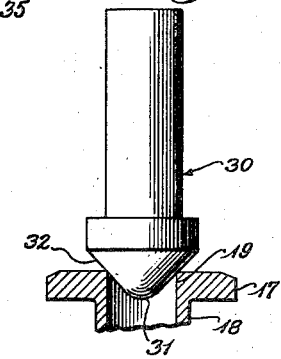
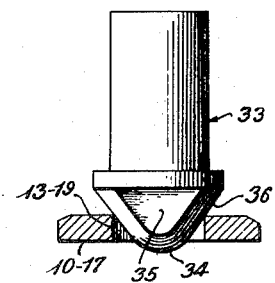
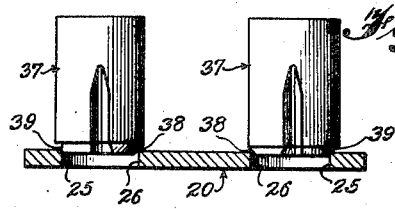
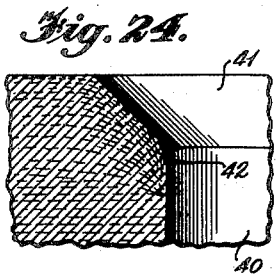
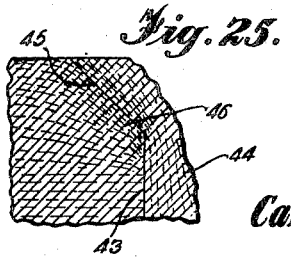
Inventor
Carl F. Lauenstein
By L. Donald Myers
Attorney

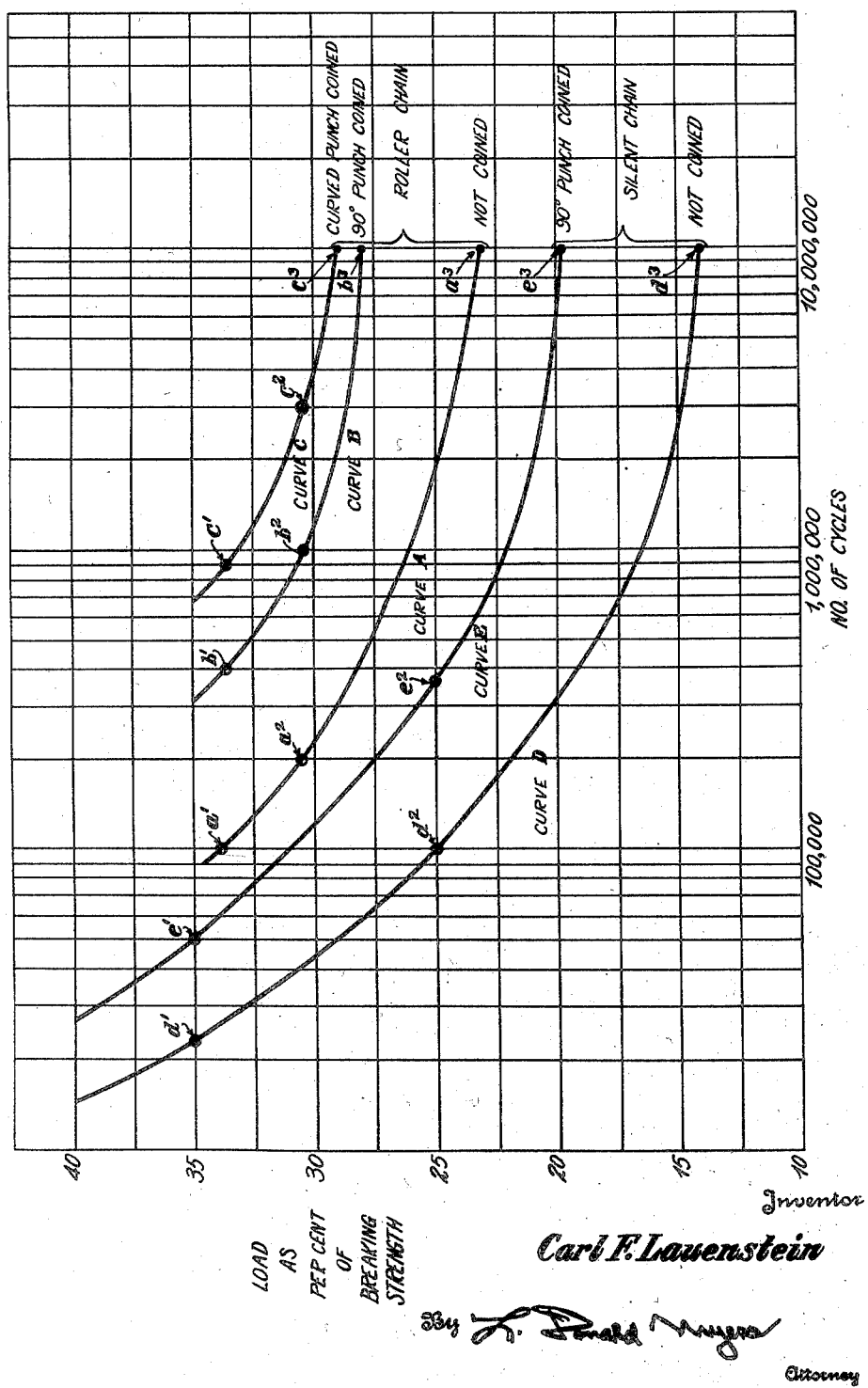

Patented Aug. 1, 1950

2,517,497

UNITED STATES PATENT OFFICE 2,517,497

METHOD OF INCREASING THE FATIGUE STRENGTH OF CHAIN LINKS

Carl F. Lauenstein, Indianapolis, Ind., assignor to Link-Belt Company, a corporation of Illinois Application March 31, 1947, Serial No. 738,442

7 Claims. (Cl. 59—35)

This invention relates to new and useful methods of increasing the fatigue strength of chain links, and deals more particularly with power transmission chains and conveyor chains of the types having separately formed and subsequently fabricated link bars or plates and joint members or having their link bars or plates cast integral with their joint members.

In the power transmission chain and conveyor chain industries, it is the present practice to classify and apply chains on the basis of their average ultimate strength, or the average unit stress the chains will sustain before rupturing. Such a practice is unfortunate because chains, which are dynamically loaded or subjected to repeated loads, fail when their fatigue strength, and not their ultimate strength, is exceeded.

The fatigue strength of manufacturers (A. S. A.) standard chains bears a relatively low ratio to their ultimate strength. For example, the fatigue strength of standard roller chains is between 15.5% and 22.5% of their ultimate strength. This range is due to differences in the finish of materials, such as hot rolled or cold rolled link bars or plates, etc. Careful studies of fatigue failures of standard roller chains, silent chains, and cast link chains having integral side bars and bushings have established the fact that breakage always occurs in the link bars or plates of the chains and originates at the side edges of the pitch holes of said bars or plates.

This relatively low ratio of fatigue strength to ultimate strength, and the consistent fatigue failure of chain link bars or plates at the side edges of their pitch holes, are due to a number of causes. First, standard roller chain links, cast links, and silent chain links are formed with bars or plates that have pitch holes formed in their end portions with the result that stress concentrations are set up at the sides of the edges of the pitch holes which have values that fall between 3.3 and 7.0. That is to say, if a standard roller chain is loaded so that its link bars or plates are subjected to a 60,000 lb. per square inch stress, the metal at the sides of the edges of the pitch holes is stressed to a value of about 3.3 or 198,000 lbs. per square inch. For standard silent chains the stress concentrations have a value of about 7.0 while for the widely varying forms of cast link chains the values fall between 3.3 and 7.0. Second, because of the surface condition of the metal, which is produced by hot rolling, cold rolling, grinding, machining, and the like, it is possible to utilize only a part of the available strength of the metal. This is due to the fact that the roughened surfaces of the metal link bars or plates provide inherent stress concentrations which account for as much as a 50% loss for hot rolled or forged surfaces and a 30% loss for cold rolled, machined, or ground surfaces.

It is well-known that the mechanism of fatigue failure resulting from repeated stressings or loadings appears to be that very fine particles of metal are stressed beyond their ultimate strength. Consequently, a tiny fatigue crack forms and progresses until failure occurs. Therefore, fatigue failures must be caused by repeated tensile stresses or loads that exceed the tensile strength of the metal at the point at which the failure starts.

By considering that standard chain link fatigue failures are due to high tensile stress concentrations at the side edges of the pitch holes of link bars or plates, it was conceived that if the metal of at least the critical areas of the pitch hole edges could be pre-stressed or pre-loaded so as to provide therein an abnormal, permanent compressive stress, then tensile stresses subsequently applied to such critical areas would be reduced in severity or destructiveness by an amount that is equal to the pre-induced compressive stress.

It is a primary object of this invention to provide methods of increasing the fatigue strength of power transmission chain links and conveyor chain links by creating an abnormal, permanent compressive stress in the metal defining and immediately adjacent to at least the areas of the edges of the pitch holes of each link bar or plate which are subjected to the highest stress concentrations.

A more specific object of the invention is to provide methods of increasing the fatigue strength of link bars or plates of power transmission chains and conveyor chains by cold coining or squeezing sufficient areas of the metal at one or both end edges of all pitch holes of said link bars or plates to pre-stress or pre-load at least the areas of said metal that are subjected to the highest stress concentrations so as to produce therein an abnormal, permanent compressive stress which will reduce in severity by the amount thereof the highly concentrated tensile stresses that are developed in the link bars or plates as a result of operation of the chain links under load.

Other objects and advantages of the invention will be apparent during the course of the following description:

In the accompanying drawings forming a part of this specification and in which like numerals are employed to designate like parts throughout the same, Figure 1 is an elevational view of a standard roller chain outside side bar or plate, Figure 2 is a longitudinal sectional view taken on line 2—2 of Fig. 1, Figure 3 is a partly elevational view and partly broken away view of a standard roller chain inside link showing the two side bars or plates with joint bushings assembled in their pitch holes but with the rollers omitted for greater clarity, Figure 4 is a similar view to Fig. 3, but discloses a cast inside link which has its two side bars or plates and its two bushings formed integral, Figure 5 is an elevational view of a standard silent chain link plate, Figure 6 is a fragmentary end elevational view of a link side bar or plate that has had the entire periphery of its pitch hole edge cold coined in accordance with the method of this invention, Figure 7 is a similar view to Fig. 6, but illustrates one way of partially cold coining the edge of the pitch hole so that the areas of the pitch hole edge which are subjected to the highest stress concentrations are treated in accordance with the method of this invention, Figure 8 is a similar view to Fig. 6, but illustrates the entire periphery of the pitch hole edge as being cold coined in accordance with the method of this invention after a separately formed joint bushing has been assembled therein, Figure 9 is an elevational view of a silent chain link plate that has had the most critical areas of its pitch hole edges cold coined in accordance with the method of this invention, Figures 10 and 11 are side elevational and end elevational views, respectively, of a concavely curved cold coining punch which is used for coining the entire peripheral edge of a chain link bar or plate pitch hole, Figures 12 and 13 are side elevational and end elevational views, respectively, of a conical cold coining punch which is used for coining the entire peripheral edge of a chain link bar or plate pitch hole, Figures 14, 15, and 16 are two side elevational and one end elevational views, respectively, of a conical cold coining punch that is used for coining the areas of pitch hole edges of link plates or bars which are subjected to the highest stress concentrations, Figures 17 and 18 are side elevational and end elevational views, respectively, of a cold coining punch that is used for coining the critical area of the edge of a pitch hole in a silent chain link plate, Figure 19 is a partly elevational view and partly transverse sectional view showing the cold coining punch of Figs. 10 and 11 properly positioned with respect to one edge of a pitch hole of a chain link bar or plate, Figure 20 is a partly elevational view and partly transverse sectional view showing a cold coining punch of the type illustrated in Figs. 12 and 13 properly positioned with respect to a pitch hole of a chain link bar or plate assembled on a bushing, Figure 21 is a similar view to Fig. 20 and shows the cold coining punch of Figs. 12 and 13 properly positioned to coin one edge of a pitch hole of a cast link of the type illustrated in Fig. 4, Figure 22 is a similar view to Fig. 19, but shows the type of cold coining punch illustrated in Figs. 14 to 16, inclusive, properly positioned for cold coining the critical areas of one edge of a pitch hole formed in a chain link bar or plate, Figure 23 is a partly elevational view and partly longitudinal sectional view illustrating two cold coining punches of the type shown in Figs. 17 and 18 properly positioned for coining the critical areas of two pitch holes formed in a silent chain link plate, Figure 24 is a highly magnified sectional view of an edge of a pitch hole formed in a chain link bar or plate that has been directly cold coined, in the manner illustrated in Figs. 19, 21, 22, and 23, and shows the manner in which the metal defining and immediately adjacent to said pitch hole edge is caused to flow, Figure 25 is a similar view to Fig. 24, but illustrates a pitch hole edge that has been cold coined with a joint bushing assembled therein, as shown in Fig. 20, and Figure 26 is a logarithmic graph having curves applied thereto which illustrate the increases in fatigue strength of chain links that result from cold coining at least the areas of the edges of the pitch holes of link bars or plates that are subjected to high stress concentrations.

In the drawings, wherein for the purpose of illustration are shown the preferred embodiments of this invention, and first particularly referring to Figs. 1 and 2, the reference character 10 designates in its entirety an outside link side bar or plate of a standard roller chain. From Fig. 1, it will be seen that this link element is of dumb-bell shape in plan and includes the two enlarged end portions 11 and the reduced waist portion 12. The pitch holes 13 are substantially symmetrically located in the enlarged end portions 11 of this side bar or plate. The pitch holes of outside link side bars or plates, of course, are intended to have assembled therein, such as by a press fitting operation, the ends of the joint pins that function to connect the outside links to the adjacent inside links.

Figure 3 illustrates a standard roller chain inside link that is formed of two side bars or plates 14 in the pitch holes 15 of which the joint bushings 16 are assembled, such as by press fitting. The link elements 14 of this inside link are of dumb-bell shape in plan like the outside link element 10 of Fig. 1.

Figure 4 is intended to be representative of cast links. In this particular illustration, the integral or one-piece link includes the two side bars or plates 17 and the joint bushings 18. The link elements 17, of course, are provided with pitch holes 19. The link elements 17 may be of dumb-bell shape like the link element 10 of Fig. 1.

It will be appreciated by those skilled in the art to which this invention relates that other types of cast links are common in the chain industry. For example, one-piece offset links are very common and consist of two side bar or plate elements with an integral bushing connecting the inside end portions of the side bars or plates. The outside end portions of said offset side bars or plates are provided with pitch holes for accommodating chain pins. Although this type of cast link is not specifically illustrated in the drawings, it is to be understood that the pitch holes of its side bars or plates can be treated by the method embodying this invention in the same manner as the cast link specifically illustrated in Fig. 4.

Figure 5 illustrates one standard form of silent chain link plate 20 which is of arched shape in elevation. It includes the enlarged or standing end portions 21, which are shaped to provide driving teeth, and a reduced waist or back portion 22. Formed in each of the two standing or tooth-shaped parts 21 are the pitch holes 23. These pitch holes are shaped in one conventional manner to provide the two projections 24 which are so arranged that they form a portion 25 for accommodating, without movement, a conventional liner, not shown, which forms a part of the joint assembly for the link or pitch in which the plate 20 is assembled. The projections 24, also, are positioned so as to provide a larger or longer pitch hole portion 26 that accommodates a second joint liner of the next adjacent or overlapping link assembly.

When standard roller chains, silent chains, or cast link chains are operating under load, the link side bars or plates are dynamically loaded, or are subjected to repeated loadings, as the chains run around their associated sprocket wheels. Because of the conventional shapes of the side bars or plates of roller chains, cast link chains and silent chains, stress concentrations are set up at the sides of the edges of all of the pitch holes of the several link bars or plates. The term "side edges" is intended to refer to the opposed edges arranged transversely of link bars or plates as distinguished from the opposed edges arranged longitudinally of said bars or plates. These stress concentrations, in standard roller chains, for example, have a value of about 3.3 with reference to the normal stress that occurs in other portions of the link side bars or plates.

Because of these high concentrations of stresses, standard roller chain link side bars or plates for both inside and outside links consistently rupture or fracture, as a result of fatigue failures, at the sides of the pitch holes, as indicated by the lines A of Fig. 1. Cast links, as represented by the disclosure of Fig. 4, also, rupture or fracture, as a result of fatigue failures, at the same locations as are represented by the lines A of Fig. 1. When considering the link plates of silent chain links, the ruptures or fractures, resulting from fatigue failures, always occur at the points or regions represented by the lines A' of Fig. 5. It is known that the stresses that are concentrated at the side edges of the pitch holes of link bars or plates are tensile stresses.

As a result of extensive experiments, it has been established that the destructive effects of these tensile stress concentrations at the side edges of the link bar or plate pitch holes can be reduced to such an extent that fatigue failures no longer occur at the side edges of the pitch holes. This highly desirable result can be accomplished by cold coining all or certain areas of the edges of the said pitch holes. These cold coining operations performed on the edges of the pitch holes pre-stress or pre-load said edges and the metal immediately adjacent thereto so as to provide or produce in said metal an abnormal, permanent compressive stress.

Before specifically describing the manner in which the pitch hole edges of link side bars or plates are cold coined, it is believed to be desirable to more specifically point out the extent to which the pitch hole edges must be cold coined to accomplish the desired result. This explanation will be presented in connection with the disclosures of Figs. 6 to 9, inclusive.

Figs. 6 and 7 are intended to represent either inside link side bars or plates and outside link side bars or plates of fabricated links, or the side bars or plates of cast links. The lines A appearing on these two figures indicate where ruptures or fractures, resulting from fatigue failures, will occur. In Fig. 6, the entire periphery of the edge of the pitch hole is cold coined as indicated by the series of short lines $a$ which radiate from the pitch hole. In other words, the radiating lines are intended to designate the area at the pitch hole edge which is affected by the cold coining operation. By cold coining the entire periphery of the pitch hole edge, the points at which fatigue failures may start are adequately taken care of.

In the disclosure of Fig. 7, the entire periphery of the pitch hole edge is not cold coined. Instead, the cold coining operation is performed so that only the opposite side areas are treated. The areas that are cold coined are represented by the short radiating lines $b$. It will be seen, however, that these cold coined areas $b$ adequately include the locations at which ruptures or fractures resulting from fatigue failures may occur, see lines A. Because the cold coined areas $b$ do take care of the points at which fractures may occur, the same improvement or increase in the fatigue strength of chain links is accomplished with partial cold coining, as represented by Fig. 7, as is accomplished with total cold coining, as represented by Fig. 6.

In other words, any partial cold coining that takes care of the points at which fatigue failures can start will accomplish the desired result.

Fig. 8 is intended to illustrate the cold coining of the pitch holes of assembled inside links of the type shown in Fig. 3. In other words, the pitch holes of the link elements 14 are cold coined at their outer ends after the bushings 16 are assembled in said pitch holes. The short radiating lines $c$ designate the area that is affected by the cold coining operation when the entire periphery of the pitch hole edge is treated. It is to be understood, however, that partial cold coining of the pitch hole edge, as represented in Fig. 7, can be performed, with equally satisfactory results, when treating pitch holes in which the bushings have been previously fitted.

Fig. 9 illustrates the best-known manner of cold coining the edges of the pitch holes formed in silent chain link plates. The areas of the pitch holes that can be cold coined are represented by the short radiating lines $d$. These areas include the portions 26 of the pitch holes and the adjacent edges of the projections 24. It will be seen that the points at which the fractures A' can occur are included in the cold coined areas $d$. It is not considered to be practical or desirable to cold coin the edge portions 25 of these silent chain link plate pitch holes because these portions of the pitch holes constitute or provide the critical bearing areas for these link plates. Due to the fact that silent chain link plates are always formed from relatively thin stock, these critical bearing portions 25 should not be disturbed in any way. It will be appreciated that the portions 26 of the pitch holes need not be completely cold coined because any partial cold coining that takes care of the points at which the fracture lines A' can occur will provide equally satisfactory results.

The permanent or pre-compressive stress that is created at the critical edge portions of the pitch holes of link bars or plates is obtained by means of cold coining punches which are forced into the ends of the pitch holes. Suitable cold coining punches are illustrated in Figs. 10 to 18, inclusive, and will be described in detail in connection with these figures.

Figs. 10 and 11 illustrate what is termed a concavely curved punch that is designated in its entirety by the reference character 27. This punch includes a head 28 that is formed with the concavely curved area 29 that extends entirely around the head at its base. The concavely curved area 29 is the portion of the head which accomplishes the essential part of the coining operation. This type of punch can be employed for cold coining pitch holes formed in the link elements 10, 14, and 17 of Figs. 1 to 4, inclusive. With this type of punch, the entire periphery of each pitch hole is cold coined, as indicated at a and c in Figs. 6 and 8.

Figs. 12 and 13 illustrate what is termed a conical cold coining punch 30. This punch includes a head 31 that is formed with a conical surface 32 which accomplishes the desired pitch hole edge coining or squeezing operation. This type of punch, also, can be used with any of the link elements of Figs. 1 to 4, inclusive, for accomplishing the type of coining that is designated by the reference characters a and c of Figs. 6 and 8.

Figs. 14 to 16, inclusive, illustrate what is termed a partial conical punch 33. This punch includes a head 34 that is cut away at its opposite side portions 35 to provide conical coining areas 36 which are spaced peripherally of the head. In other words, the critical coining areas 36 are not joined or do not provide a continuous peripheral area like those provided by punches 27 and 30. This type of partial conical punch 33 performs the partial coining operation that is represented by Fig. 7. Although this partial coining punch 33 is illustrated as being the conical type, like punch 30 of Figs. 12 and 13, it is to be understood that the critical coining areas 36 may be concavely curved like the area 29 of punch 27 illustrated in Figs 10 and 11.

Figs. 17 and 18 illustrate what is termed a conical silent chain link plate coining punch 37. This punch is provided with a conical coining area 38 that is diametrically opposed by a perpendicular backing area 39. In other words, the conical coining area 38 is of proper peripheral dimensions to cold coin the areas d illustrated in Fig. 9 while the perpendicular backing portion 39 of this punch engages the uncoined pitch hole portion 25 of the link plate shown in Fig. 9. Although the cold coining portion 38 of this punch 37 is shown as being conical, it is to be understood that it can be concavely curved like the critical portion 29 of the head of punch 27 shown in Figs. 10 and 11.

Because the heads of all of the punches shown in Figs. 10 to 18, inclusive, are larger in diameter, at least at their critical cold coining portions, than the pitch holes that are to be coined thereby, and are either of conical or concavely curved shape, the punches tend to stretch the metal at the coined edges of the pitch holes when the punch heads are forced into the pitch holes. The affected areas are very small—only a few thousandths of an inch back from each coined pitch hole edge area. However, the affected areas are stressed beyond the yield point of the metal and the metal is appreciably elongated. The relatively large unstretched volume of metal back of each stretched area, after a punch has been removed from the pitch hole, forces the stretched area back to somewhere near its original dimensions, thus leaving highly compressive stresses stored up in the metal of the affected area.

Because of the presence of the stored up compressive stresses at the affected areas of the pitch hole edges, each time these affected areas of the pitch hole edges are subsequently subjected to highly concentrated tensile stresses, said tensile stresses are counteracted or nullified to an amount equal to the value of the pre-compressive stresses. That is to say, each affected pitch hole edge area will only be subjected to the destructive effect of tensile stresses to the extent that the concentrated tensile stresses exceed the pre-compressive stresses.

It has been determined that the best time for performing the cold coining operations on the edges of the pitch holes is just prior to assembly of the chain links. Of course, the best results are obtained when the cold coining operations are performed on the edges of both ends of each pitch hole. In treating either inside link side bars or plates, outside link side bars or plates, or silent chain link plates, the edges at the opposite ends of the pitch holes can be coined either separately or simultaneously. This is true regardless of whether the entire periphery of each pitch hole edge is coined or whether only partial coining is accomplished. The same pressure is required for either one of these types of operations. The fact which determines whether the edges at the opposite ends of pitch holes will be simultaneously or separately cold coined is the thickness of the link bars or plates relative to the axial dimensions of the cold coining punches that are employed. In other words, the axial dimensions of the pitch holes must equal or exceed the combined axial dimensions of the inserted portions of the two oppositely positioned punches to permit opposed punches to be employed simultaneously for cold coining the edges of both ends of the pitch holes.

Fig. 19 illustrates the concavely curved punch 27 of Figs. 10 and 11 in operation for cold coining one edge of the pitch hole 13 of the link bar or plate 10 shown in Figs. 1 and 2. It is seen that the critical portion 29 of the punch head 28 is properly engaging the edge of the pitch hole to effect the desired coining operation.

Fig. 20 illustrates the conical punch 30 of Figs. 12 and 13 operating to cold coin the upper edge of the pitch hole 15 of a link element 14 after the bushing 16 has been assembled in the pitch hole. In other words, this cold coining operation is illustrated as being performed on the assembled link of Fig. 3. The critical conical portion 32 of the head 31 of this punch 30 is illustrated as operating to cold coin the upper edge of the pitch hole 15 through the metal of the adjacent portion of the bushing 16.

Fig. 21 illustrates the conical punch 30 of Figs. 12 and 13 operating to cold coin the outer edge of the pitch hole 19 formed in the cast link of Fig. 4. The critical conical portion 32 of the punch head 31 is positioned to properly effect this desired coining operation.

Fig. 22 illustrates a partial conical punch 33 of Figs. 14 to 16, inclusive, operating to cold coin opposed side areas of the edge of the pitch hole 13—19 as illustrated in Fig. 7. The peripherally spaced, critical conical areas of this punch 38 are illustrated as being properly positioned relative to the pitch hole edge to perform the desired cold coining operation.

Fig. 23 illustrates a silent chain link plate 20 being properly cold coined by means of two of the punches 37 shown in Figs. 17 and 18. This figure illustrates more clearly the way in which the portions 38 and 39 of the punch heads cooperate with the portions 26 and 25 of the pitch holes to accomplish the desired partial cold coining of the pitch hole edges.

It is important to note that the link bar or plate pitch hole edges should not be coined in such a way as to materially reduce the thickness of the metal through the pitch holes or to push a burr into the pitch holes. Any burring or material reduction of the thickness of the metal through the pitch holes will reduce the grip of the link bars or plates on the joint elements which would be very undesirable. It will be appreciated, however, that the higher the pressure that can be employed for forcing the cold coining punches into the ends of the pitch holes without materially modifying the shape or dimensions of the metal defining and immediately adjacent to the edges of the pitch holes, the higher the value of the compressive stresses that will be stored up in the metal immediately adjacent the edges of the pitch holes. It definitely has been established that the shape or contour of the critical areas of the cold coining punches has a very direct bearing on the maximum amount of pressure that can be employed without detrimentally affecting the metal through the pitch holes. Whether the link bars or plates are cold rolled or hot rolled, also, has a direct bearing on the amount of pressure that can be employed.

For example, when the conical punches of Figs. 12 to 18, inclusive are employed for cold coining the edges of pitch holes of cold rolled link bars or plates, when not assembled on joint bushings, the maximum pressure that can be employed, without materially reducing the thickness of the metal through the pitch holes or pushing burrs into the pitch holes, is approximately 2,300 lbs. per linear inch of pitch hole edge, while a maximum pressure of approximately 2,500 lbs. per linear inch of pitch hole edge can be employed with these conical punches when hot rolled link bars or plates are coined. When the concavely curved punch of Figs. 10 and 11 is employed for cold coining the pitch hole edges of link bars or plates, unassembled with reference to joint bushings, a maximum pressure of 3,300 lbs. per linear inch of pitch hole edge safely can be employed when treating cold rolled link bars or plates, and a pressure of 3,500 lbs. per linear inch of pitch hole edge can be employed when cold coining hot rolled link bars or plates. It will be appreciated, therefore, that the concavely curved type of punch is best suited for use on link bars or plates that are unassembled with reference to chain joint members.

The conical type of punch has been found to be most suitable for cold coining pitch holes in which bushings have been assembled. For example, a maximum pressure of 3,000 lbs. per linear inch of pitch hole edge can be employed with the conical type of punch when cold coining cold rolled link bars or plates. A correspondingly higher pressure, of course, can be employed in treating hot rolled link bars or plates with the conical type of punch.

Fig. 24 represents an attempt at reproducing a micro-photograph taken of a cross-section through a pitch hole edge portion of a chain link bar or plate. This link element is intended to be representative of either an unassembled outside link side bar or plate, an unassembled inside link side bar or plate, a silent chain link plate, or a cast link side bar or plate that has been cold coined by having an appropriate punch forced into the end of the pitch hole 40. The model of which the micro-photograph was taken was magnified one hundred times. After the cold coining punch was removed from the pitch hole 40, the edge of the pitch hole remained slightly deformed, as indicated by the reference character 41. This view illustrates the manner in which the metal has been bent, or has been caused to flow inwardly, relative to the axial dimension of the pitch hole. The inward bending of the grain structure of the metal is intended to be indicated by the lines designated by the reference character 42.

The illustration of Fig. 25 is intended to show an inside link side bar or plate that has been cold coined at one edge of its pitch hole 43 after a bushing 44 has been assembled therein. This view, also, shows the external deformation of the pitch hole edge at 45 and the inward bending or flowing of the grain structure at 46.

The graph of Fig. 26 shows curves which represent the fatigue strength ratings of three different roller chains and two different silent chains. The three different roller chains were all identical so far as material used and processing thereof were concerned. The two silent chains, also, were similarly identical. It will be noted that the horizontal lines of this graph represent applied loads presented in percentages of breaking strengths while the vertical lines represent the number of load cycles the five different chains withstood at different applied loads.

Curve A represents the fatigue strength rating of a standard roller chain which had not had the edges of the pitch holes of its link bars or plates cold coined in accordance with the methods embodying this invention. Curve B represents the fatigue strength rating of a roller chain that had all of its pitch hole edges either completely or partially cold coined at both ends by means of conical punches. Curve C represents the fatigue strength rating of a roller chain that had all of its pitch hole edges either partially or completely cold coined at both ends by means of concavely curved coining punches. Curve D represents the fatigue strength rating of a standard silent chain which had not had the edges of the pitch holes of its link plates cold coined in accordance with the method embodying this invention. Curve E represents the fatigue strength of a silent chain that had all of the edges of its pitch holes cold coined at both ends, in the manner illustrated in Fig. 9, by means of conical punches.

It will be noted that each one of these five curves is terminated at the vertical line that represents 10,000,000 load cycles. Chains customarily are rated at their runout loads, which are the loads that the chains will withstanding 10,000,000 load cycles or times without failure and the load that is generally considered as being that below which no failure will occur.

The lower or right-hand extremity of curve A, therefore, indicates that the uncoined standard roller chain had a fatigue strength rating at its runout load which was about 23% of the breaking strength of that chain, while curve B indicates a fatigue strength rating at its runout load at about 28% of the breaking strength, and curve C indicates a fatigue strength rating at its runout load of 29% of the breaking strengths of these two coined chains. Curve D, which represents an uncoined silent chain, had a fatigue strength rating at its runout load which was about 13.75% of its breaking strength, while the coined silent chain represented by curve E had a fatigue strength rating at its runout load which was almost 20% of its breaking strength.

Referring to a few specific points on curve A, which represent the number of load cycles the uncoined roller chain withstood at different fatigue strength ratings, point $a'$ shows that this uncoined chain had a fatigue strength rating of 33.25% of its breaking strength at 100,000 load cycles, while point $a2$ shows a fatigue strength rating of about 30.25% at 200,000 load cycles, and point $a3$ shows a fatigue strength rating of 23% at its runout load of 10,000,000 cycles.

Curve B shows at point $b'$ that the roller chain which was cold coined with the conical type of punch had a fatigue strength rating of about 33.25% of its breaking strength at 400,000 load cycles; at point $b2$ a fatigue strength rating of about 30.25% at 1,000,000 load cycles; and at point $b3$ a fatigue strength rating of about 28% at its runout load of 10,000,000 load cycles.

Curve C, which represents the roller chain that was cold coined with the concavely curved type of punch, shows at point $c'$ a fatigue strength rating of about 33.25% of its breaking strength at 900,000 load cycles; at point $c2$ a fatigue strength rating of about 30.25% at 3,000,000 load cycles; and at point $c3$ a fatigue strength rating of about 29% at its runout load of 10,000,000 load cycles.

From the above comparative data, it will be seen that with fatigue strength ratings of about 33.25% of their breaking strengths (see points $a'$, $b'$, and $c'$) the cold coined chain represented by curve B withstood four times the number of load cycles as the uncoined roller chain represented by curve A, while the cold coined roller chain represented by curve C withstood nine times the number of load cycles as the said uncoined chain. With fatigue strength ratings of about 30.25% of their breaking strengths (see points $a2$, $b2$, and $c2$) the cold coined roller chain of curve B withstood five times the number of load cycles as the uncoined roller chain of curve A, while the cold coined roller chain of curve C withstood fifteen times the number of load cycles as the said uncoined roller chain.

As of further possible interest, it will be noted that at points $a'$, $b'$, and $c'$ each of the three roller chains was operating under a load of about 2,850 lbs., while at points $a2$, $b2$, and $c2$ each chain was operating under a load of about 2,650 lbs. At point $a3$ the uncoined roller chain was operating under a load of about 1,950 lbs.; at point $b3$ the represented coined chain was operating under a load of about 2,400 lbs.; and at point $c3$ the represented coined chain was operating under a load of about 2,500 lbs.

Coming now to the curve representing the uncoined silent chain, curve D shows at point $d'$ that the uncoined silent chain had a fatigue strength rating of about 35% of its breaking strength at about 24,000 load cycles; at point $d2$ a fatigue strength rating of about 25% at about 100,000 load cycles; and at point $d3$ a fatigue strength rating of about 13.75% at its runout load of 10,000,000 load cycles.

Curve E, which represents a cold coined silent chain, shows at point $e'$ a fatigue strength rating of about 35% of its breaking strength at about 50,000 load cycles; at point $e2$ a fatigue strength rating of about 25% at about 350,000 load cycles; and at point $e3$ a fatigue strength rating of almost 20% at its runout load of 10,000,000 load cycles.

From the above references to the five curves presented on the graph of Fig. 26, it will be seen that these methods of cold coining at least the areas of the pitch hole edges of chain link bars or plates that are subjected to the highest stress concentrations provide very desirable and beneficial results. In some sizes of roller chains, it has been found to be possible to cold coin the pitch hole edges of the link bars or plates to such an extent that failure no longer occurs at the sides of the pitch holes, as represented by the lines A of Figs. 1, 6, 7, and 8, but is transferred to the reduced waist portions of said link bars or plates, as indicated by line B of Fig. 1 at, of course, a much higher load or a much greater number of load cycles. In connection with silent chains, cold coining of the type illustrated in Fig. 5 is so effective that failure no longer occurs at the sides of the pitch holes, as represented by lines A' of Figs. 5 and 9, but is transferred to the outer end portions of the link plates, as indicated by the lines B' of Figs. 5 and 9 at, of course, a much higher load or a much greater number of load cycles.

Since most chain failures are caused by fatigue of the link bars or plates, the coining operations of the methods embodying this invention present a means of producing chains for installations now causing trouble from this source which will be free from such fatigue failures. On new installations, these coining methods make possible the application of smaller, lower priced chains where heretofore larger, more expensive chains would have been applied.

Although this method has been specifically described with reference to the cold coining of the pitch hole edges of the bars or plates of roller chains and cast link chains and of the link plates of silent chains, it is to be understood that the methods apply equally as well to any other design of chain that includes link bars, link plates, or cast links which have pitch holes formed therein to accommodate chain joint pins or bushings.

It is to be understood that I do not desire to be limited to the exact order of method steps as they have been disclosed, for variations and modifications of the same, which fall within the scope of the accompanying claims, are contemplated.

Having thus described the invention, I claim:

1. A method of cold coining chain elements having pitch holes to increase the fatigue strength rating of said elements, comprising applying only to both outer edge areas of the pitch holes of the cold chain elements and at least to the portions of said edge areas that are subjected to the highest stress concentrations a pressure sufficient to stretch beyond its yield point the metal immediately adjacent said edge areas, stopping the application of said pressure to allow the stretched metal to return to substantially its original dimensions so that a high permanent compressive stress is stored up in the metal immediately adjacent said edge areas, and finally assembling said chain elements with the said high permanent compressive stress still stored therein.

2. A method of cold coining chain elements having pitch holes to increase the fatigue strength rating of said elements, comprising forcing into both ends of each pitch hole of the cold chain elements coining tools that are so shaped as to apply to only the pitch hole edge areas and at least the portions of said edge areas that are subjected to the highest stress concentrations in general oblique directions relative to the adjacent faces of the chain elements a pressure sufficient to stretch beyond its yield point the metal immediately adjacent said edge areas, withdrawing the tools to allow the stretched metal to return to substantially its original dimensions so that a high permanent compressive stress is stored up in the metal immediately adjacent said pitch holes, and finally assembling said chain elements with the said high permanent compressive stress still stored therein.

3. A method of cold coining chain elements having pitch holes to increase the fatigue strength rating of said elements, comprising simultaneously applying only to both outer edge areas of the pitch holes of the cold chain elements a pressure sufficient to stretch beyond its yield point the metal immediately adjacent said edge areas, stopping the application of said pressure to allow the stretched metal to return to substantially its original dimensions so that a high permanent compressive stress is stored up in the metal immediately adjacent said edge areas, and finally assembling said chain elements with the said high permanent compressive stress still stored therein.

4. A method of cold coining chain elements having pitch holes to increase the fatigue strength rating of said elements, comprising applying only to the portions of both outer edge areas of the cold chain elements pitch holes that are subjected to the highest stress concentrations a pressure sufficient to stretch beyond its yield point the metal immediately adjacent said edge areas, stopping the application of said pressure to allow the stretched metal to return to substantially its original dimensions so that a high permanent compressive stress is stored up in the metal immediately adjacent said edge areas, and finally assembling said chain elements with the said high permanent compressive stress still stored therein.

5. A method of cold coining chain elements having pitch holes to increase the fatigue strength rating of said elements, comprising applying only to the entire peripheries of both outer edge areas of the pitch holes of the cold chain elements a pressure sufficient to stretch beyond its yield point the metal immediately adjacent said edge areas, stopping the application of said pressure to allow the stretched metal to return to substantially its original dimensions so that a high permanent compressive stress is stored up in the metal immediately adjacent said edge areas, and finally assembling said chain elements with the said high permanent compressive stress still stored therein.

6. A method of cold coining side plate chain elements having pitch holes to increase the fatigue strength rating of said elements, comprising applying only to both outer edge areas of the pitch holes of the cold chain elements and at least to the portions of said edge areas that are subjected to the highest stress concentrations a pressure sufficient to stretch beyond its yield point the metal immediately adjacent said edge areas, stopping the application of said pressure to allow the stretched metal to return to substantially its original dimensions so that a high permanent compressive stress is stored up in the metal immediately adjacent said areas, and finally assembling said chain elements with the said high permanent compressive stress still stored therein.

7. A method of cold coining integral side plate and tubular bushing chain elements having pitch holes to increase the fatigue strength rating of said elements, comprising applying only to both outer edge areas of the pitch holes of the cold chain elements and at least to the portions of said edge areas that are subjected to the highest stress concentrations a pressure sufficient to stretch beyond its yield point the metal immediately adjacent said edge areas, stopping the application of said pressure to allow the stretched metal to return to substantially its original dimensions so that a high permanent compressive stress is stored up in the metal immediately adjacent said edge areas, and finally assembling said chain elements with the said high permanent compressive stress still stored therein.

CARL F. LAUENSTEIN.

REFERENCES CITED

The following references are of record in the file of this patent:

UNITED STATES PATENTS

| Number | Name | Date |
|---|---|---|
| 669,108 | Wood | Mar. 5, 1901 |
| 1,367,238 | Coakley | Feb. 1, 1921 |
| 1,784,866 | Fahrenwald | Dec. 16, 1930 |
| 2,424,087 | Focke et al. | July 15, 1947 |